Feb. 16, 1943.  S. GOODMAN  2,311,536
ASSEMBLY MACHINE
Filed May 24, 1941
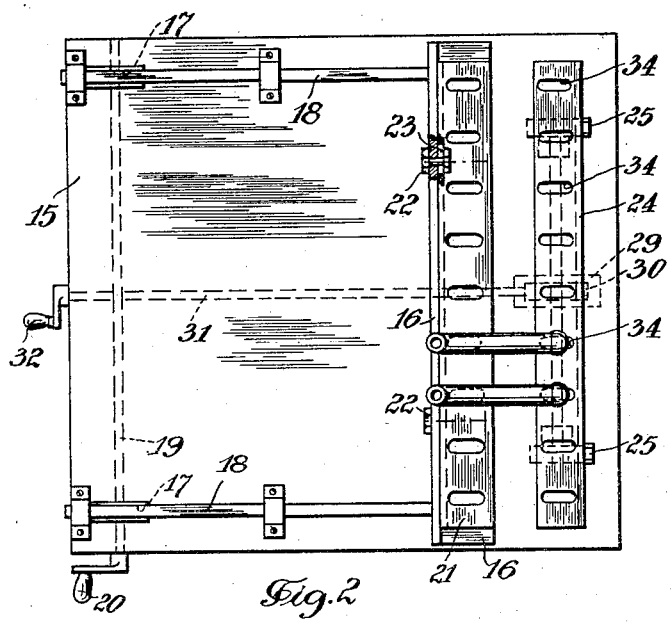
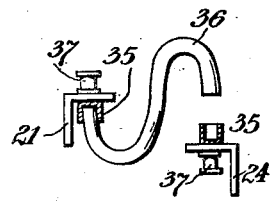
Fig.3
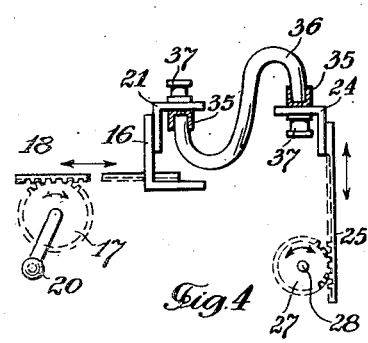
Fig.4
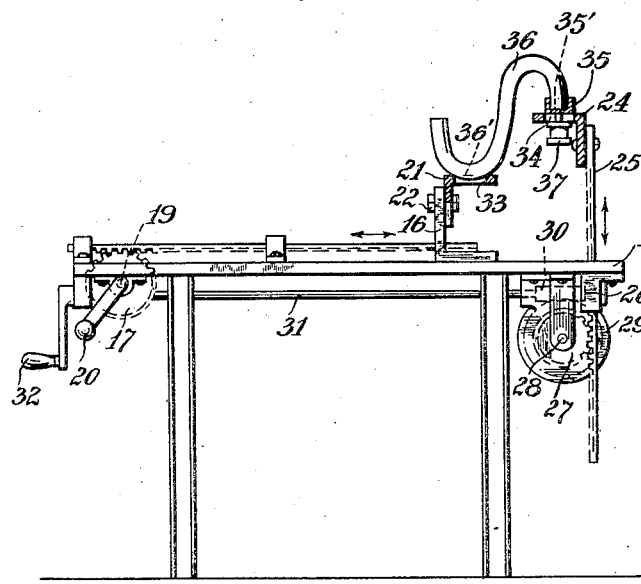
Fig.1
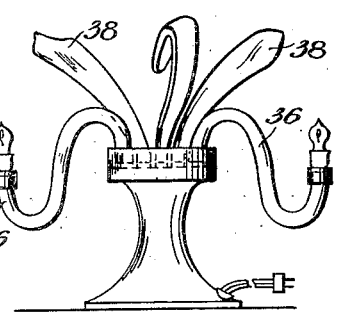
Fig.5
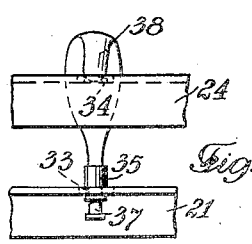
Fig.6
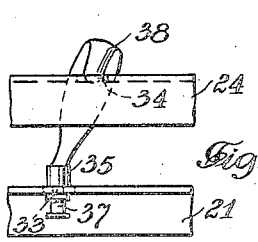
Fig.7
INVENTOR:
SOL GOODMAN
BY
ATTORNEY.

Patented Feb. 16, 1943

2,311,536

UNITED STATES PATENT OFFICE 2,311,536

ASSEMBLY MACHINE

Sol Goodman, New York, N. Y.

Application May 24, 1941, Serial No. 394,973

2 Claims. (Cl. 29—89)

The present invention relates to assembly machines and more particularly to the type adapted for the mounting of various elements at the ends of a series of tubings or rods of various shapes.

An object of this invention is to provide a machine of the character mentioned of novel and improved construction, adapted for mounting of sockets, ferrules, cups or the like at the ends of, for example, glass tubes, rods or other members of various shapes commonly used in the manufacture of lamps, candlesticks, chandeliers and the like.

Another object hereof is to provide a novel and improved machine of the type mentioned, adapted for mounting various elements at one or both ends of tubes, rods or other members of various shapes, either in axial alignment with said members, or in angular relationship to the axes of said members.

A further object of this invention is to provide a machine of novel and improved construction which is adapted to accomplish the aforesaid assembly operations on members of various sizes, that is, adjustment can be made for any size of members onto the ends of which desired elements are to be mounted.

Another object hereof is to provide a machine of the kind mentioned, of novel and improved construction, which is a labor saving device affording rapid operation and mass production in assembly operations of the character set forth.

Still another object hereof, is to provide a machine of the nature set forth, which is simple in construction, easy to operate, inexpensive to build, capable of effecting the assembly of a large number of components simultaneously, and efficient in carrying out the purposes for which it is designed.

Other objects and advantages will become manifest as this disclosure proceeds.

In the accompanying drawing, forming part of this application, similar characters of reference indicate corresponding parts in all the views.

Fig. 1 shows a side elevation of a machine embodying the present invention.

Fig. 2 is a plan view thereof.

Fig. 3 is a diagrammatic fragmentary view showing relative positions of several of the machine components as arranged immediately prior a particular assembly operation.

Fig. 4 is a similar view at the completion of the assembly operation aforesaid.

Fig. 5 is a front elevation of a decorative lamp structure fabricated of parts which individually taken as to form, are one of a series of components on the ends of which socket-form elements have been mounted by the use of the machine shown in Fig. 1.

Fig. 6 shows a component of said lamp, resting on the machine, with an end of said component set within a socket-form element in substantial symmetrical relation.

Fig. 7 is of the same subject matter illustrated in Fig. 6, but the component, which is one of a series similarly dealt with on the machine, has been shifted to an angular position with respect to the socket-like element, in which relation it is desired to effect assembly.

In the drawing, the numeral 15 indicates a table, on which angle member 16, is slidable horizontally to any desired position therealong by means of gears 17 in engagement with the racks 18, the latter extending from said member 16. The gears 17 are on shaft 19, which is rotatable by means of the handle 20. The member 16, carries a shelf member 21 thereon, which is secured thereto by any suitable means as for instance the bolts 22 through the slots 23 in shelf member 21. It is apparent that the shelf member 21, upon loosening of said bolts 22 can be shifted a short distance longitudinally along the member 16. The numeral 24, indicated a second shelf member, from which there extends downwardly the racks 25, which are slidably mounted in suitable brackets 26. Gears 27, carried by the shaft 28, are in respective engagement with said racks 25. Said shaft 28, also carries the wheel 29, which is adapted to be driven by a worm 30 mounted on shaft 31, rotatable by means of the handle 32. Both shelf members 21 and 24, are provided with socket-like means identically spaced along each of said shelf members respectively, and such socket-like means may be, for instance, the slots 33 and 34. These slots are adapted to receive for mounting, the sockets 35, or to serve as a rest for the shaped members 36, as at 36'. It is evident that shelf member 24 may be raised or lowered with respect to the plane of the table 15; the shelf member 21 may be slid forward and rearward along said table 15, with respect to the second shelf member 24, and when required, the first shelf member is capable of some longitudinal movement.

Examples of assembly operations which are performed with the machine herein, will now be described.

To mount sockets 35 onto the ends of for instance S-shaped members 36, shelf 21 is positioned so that the slots 34 and 35 are in alignment. A series of sockets 35, are mounted atop the shelf member 24, one in each of the slots 34. These sockets have downwardly extending threaded nipples 35' which are adapted to receive the temporary mounting nuts 37, whereby said sockets 35 are secured to said shelf member 24. A series of the S-shaped members 36, are then positioned as shown in Fig. 1, namely, an end thereof of each of them, in one of the sockets 35 respectively, and a bend thereof resting on shelf 33, within the slots 33, respectively, as at 36'. Of course, the shelf members are moved by operation of the handles 20 and 32, so that they are properly postioned with respect to the dimensions of the members 36. The components 36 usually being of glass or similar materials in the novelty lamp and chandelier line, a little plaster of Paris or other suitable cement material is poured into each of the sockets 35, and permitted to harden. Then the retaining nuts 37, in Fig. 1 are removed, and all of the members 36 with the sockets 35 already mounted on one of their respective ends, are mounted on the machine as shown in Fig. 3; that is, onto the underside of shelf members 21 through the slots 33. A second series of sockets 35 are mounted atop the shelf member 24, as in Fig. 3. However, the shelf members 21 and 24, are first moved by means of the operating handles 20 and 32, so that they are the proper distance apart and shelf member 24 sufficiently lowered and in proper position so that said shelf member 24 may be raised as in Fig. 4, whereby the entire series of members 36 are admitted one each at their uncapped ends into the sockets 35 on shelf member 24, whereby simultaneously, the entire series of S-shaped members 36 have each of their ends fitted with sockets. Now, cementing substance is poured a little into each of the sockets 35, which are along the shelf member 24, referring to Fig. 4, and when hardened, the nuts 37 are removed, and the fully assembled series of S-shaped members 36 are taken off. By operation of the handles 20 and 32, the positions of the shelf members 21 and 24 are shifted to that as shown in Fig. 1, when a new batch of members 36 can be dealt with.

Depending upon the shape and dimensions of the members to be capped at one or both their ends with sockets 35 and the like, so will the positions of the shelf members 21 and 24 need be moved for adaptation of the machine to carry out the assembly operations.

When it is desired to mount sockets 35, onto an end of for instance the leaf members 38, which are included in the lamp structure illustrated in Fig. 5, where however, the axis of each leaf member 38 is inclined with respect to the axis of the socket 35 thereon, then a series of sockets 35, are mounted along the shelf member 21, and the positions of the shelf members 21 and 24 are shifted to accommodate the series of leaf members 38 thereacross, so that the lower ends of said members rest respectively in the sockets 35, while the slots 34 serve to position the other ends of said members; the slots 33 and 34 being in alignment. Now bolts 22 are loosened and shelf member 21 is longitudinally shifted whereby the slots 33 and 34 are brought out of alignment, and thereupon the members 38 will thereby become tilted as in Fig. 7; their slope depending upon the amount of longitudinal movement of the shelf member 21. Cement substance is now poured a little into each of the sockets and permitted to harden. It is advisable to have the slots 33 and 34 elongated in shape, to permit adjustment for slight irregularities occurring in the dimensions of the members 36 for instance, as happens when such members are of glass or similar substance.

The convenient and expeditious maneuvering of the shelf member positions, to accomplish resting, shifting and conveying and positioning operations, and the construction whereby the socket members 35 may be mounted onto the shelf members atop thereof or dependent therefrom, lends greatly to the adoption of the machine to a large variety of sizes and shapes to be dealt with thereon, and mass production of lamps, chandeliers and other novelties made of bent glass tubing and rods principally, is facilitated.

This invention is capable of numerous forms and various adaptations and modifications without departing from the essential features herein disclosed. It is therefore intended and desired that the embodiment shown herein be deemed illustrative and not restrictive and that the patent shall cover all patentable subject matter herein taught; reference being had to the following claims rather than to the specific description herein to indicate the scope of the invention.

I claim:

1. In an assembly machine of the character described, the combination of a frame, a pair of elongated shelf members provided with socket-like means therealong similarly spaced on each of said members respectively, and means on the frame for independently moving one of the shelf members along the horizontal and for independently moving the other shelf member along the vertical; said shelf members being in constant parallel, longitudinally fixed relation, adapted to receive various elements thereon and thereacross which require to be assembled.

2. A machine as set forth in claim 1, wherein one of the shelf members is longitudinally moveable with respect to the other shelf member, whereby elements positioned across the shelf members may be simultaneously tilted.

SOL GOODMAN.